March 7, 1933.  G. B. FISHER  1,900,702

SAW

Filed May 4, 1931

Inventor
Guy B Fisher
By Hardway Cather
Attorneys

Patented Mar. 7, 1933

1,900,702

UNITED STATES PATENT OFFICE

GUY B. FISHER, OF BLANDLAKE, TEXAS

SAW

Application filed May 4, 1931. Serial No. 534,823.

This invention relates to a novel type of saw.

One object of the invention is to provide a saw of the character described having disc like cutters and also having drag teeth alternately arranged with said cutters.

Another object of the invention is to provide, in a saw of the character described, a novel type of drag tooth.

Another object of the invention is to provide in a saw of the character described novel means for mounting the disc cutters so that they will make a cut of sufficient clearance and so that they can be readily removed and replaced in making necessary repairs.

With the above and other objects in view the invention has particular relation to certain novel features of construction, arrangement of parts and use, an example of which is given in this specification and illustrated in the accompanying drawing wherein.

Figure 1:
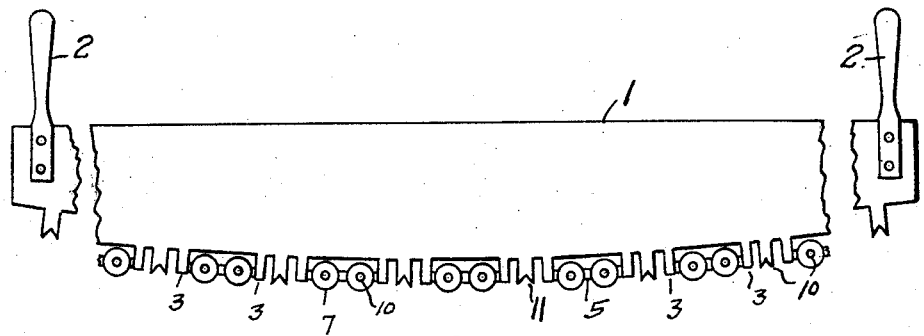
Figure 1 shows a side view of the saw.
Figure 2:
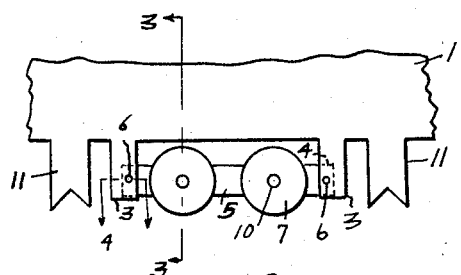
Figure 2 shows an enlarged fragmentary side view.

In the drawing the numeral 1 designates the blade of the saw. In the form shown, the handles 2, 2 are provided one at each end, Figure 1 showing the cross cut type of saw. If desired a saw of the single handle type may be constructed embodying the principle of the invention.

At the toothed edge of the saw a plurality of pairs of anchors 3, 3 are provided and the facing edges of the anchors of each pair may be provided with dove-tailed grooves as 4 into which the correspondingly shaped ends of the bars 5 may be fitted and pinned therein by suitable pins as 6, 6. Other means for anchoring the bars 5 to the anchors 3 may be employed if desired.

Figure 3:
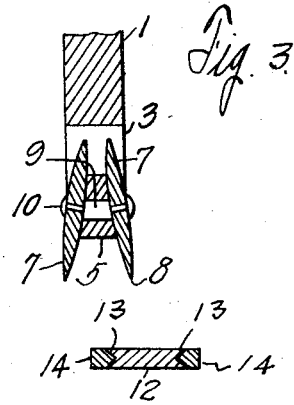
Figure 3 shows a cross sectional view taken on the line 3—3 of Figure 2.
Figure 4:
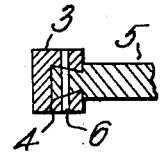
Figure 4 shows a fragmentary sectional view taken on the line 4—4 of Figure 2.

The side faces of the bars 5 converge toward the blade 1 as shown in Figure 3, and disc-like cutters as 7 are mounted to ride against said converging faces as shown in Figure 3. Each cutter has a sharp annular margin 8 as shown. The cutters 7, accordingly, diverge toward the work so that the cut will have sufficient clearance to permit the blade 1 to pass therethrough without binding. The cutters may be mounted on the bars 5 in any preferred manner. As shown, each bar 5 has the removable bearing blocks 9 therethrough having the end spindles 10, 10 on which said cutters are mounted to rotate. Antifriction washers may be located between the cutters and bars 5 if desired.

Between the pairs of anchors 3 are the drag teeth 11 which drag out the cuttings, or sawdust.

Figures 5, 6:
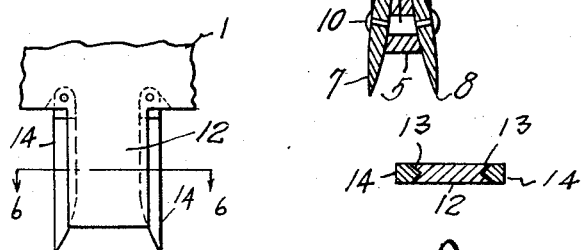
Figure 5 shows an enlarged fragmentary side view showing a novel type of drag tooth employed.
Figure 6 shows a cross sectional view thereof taken on the line 6—6 of Figure 5.

In the form shown in Figure 5 a novel type of drag tooth is shown which may be substituted for the ordinary drag teeth 11. In this form there is the anchor 12 formed integrally with the blade 1 and arranged at intervals between the assemblies of cutters 7. The side margins of each anchor 12 have the grooves 13 therein in which the adjacent edges of the drag teeth 14 fit. These drag teeth 14 are pivoted at their upper ends to the blade 1. As the saw is moved in one direction the forward, or advancing drag tooth 14 will drag out the cuttings or sawdust and the following drag tooth 14 will swing outwardly and thus permit the advancing tooth 14 to penetrate deeper into the work and said following tooth will not impede the movement of the saw by its frictional contact with the bottom of the cut and a very light running saw will thus be provided.

The drawing and description disclose what is now considered to be a preferred form of the invention, by way of illustration only, while the broad principle of the invention will be defined by the appended claims.

What I claim is:

1. In a saw having a blade and anchors at the operative edge thereof; drag teeth pivoted at their upper ends to the blade and lying alongside the opposite margins of the anchor.

2. In a saw having a blade and anchors at the operative edge thereof; drag teeth pivoted at their upper ends to the blade and lying alongside the opposite margins of the anchor, said anchor having side grooves in which the drag teeth are adapted to seat.

3. In a saw having a blade and anchors at the operative edge thereof; drag teeth pivoted at their upper ends to the blade and lying alongside the opposite margins of the anchor, each drag tooth and the adjacent margin of the anchor being provided one with a groove in which the other is adapted to seat.

4. In a saw having a blade provided with cutters at one edge thereof and having anchors arranged along said edge between said cutters; drag teeth provided to rake the sawdust from the cut in the work and pivoted at their upper ends to the blade and lying alongside opposite margins of the anchors, each drag tooth and the adjacent margin of an anchor being provided one with a groove in which the other is adapted to seat.

In testimony whereof I have signed my name to this specification.

GUY B. FISHER.